(12) United States Patent
Yonezawa et al.

(10) Patent No.: US 11,325,583 B2
(45) Date of Patent: May 10, 2022

(54) HYBRID VEHICLE AND METHOD OF CONTROLLING HYBRID VEHICLE

(71) Applicant: TOYOTA JIDOSHA KABUSHIKI KAISHA, Toyota (JP)

(72) Inventors: Koichi Yonezawa, Toyota (JP); Satoshi Yoshizaki, Gotenba (JP); Osamu Maeda, Toyota (JP); Daigo Ando, Nagoya (JP); Yoshikazu Asami, Gotenba (JP); Kenji Itagaki, Shizuoka-ken (JP); Shunsuke Oyama, Nagakute (JP); Koichiro Muta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 16/844,565

(22) Filed: Apr. 9, 2020

(65) Prior Publication Data
US 2020/0331453 A1 Oct. 22, 2020

(30) Foreign Application Priority Data

Apr. 16, 2019 (JP) .............................. JP2019-077718

(51) Int. Cl.
*B60W 20/15* (2016.01)
*B60W 10/06* (2006.01)
(Continued)

(52) U.S. Cl.
CPC ............ *B60W 20/15* (2016.01); *B60W 10/06* (2013.01); *B60W 10/08* (2013.01);
(Continued)

(58) Field of Classification Search
CPC ...... B60W 20/15; B60W 10/06; B60W 10/08; B60W 2710/083; B60W 2510/0657; B60W 2510/0638; B60W 2710/0666; B60W 30/1882; B60W 20/16; F02D 41/0235; F02D 2250/18; F02D 2250/38;
(Continued)

(56) References Cited

U.S. PATENT DOCUMENTS

| | | | |
|---|---|---|---|
| 2015/0377158 A1* | 12/2015 | Benjey | F02D 41/0007 701/22 |
| 2018/0134273 A1* | 5/2018 | Oh | B60W 30/188 |
| 2018/0222469 A1* | 8/2018 | Iwase | B60W 30/182 |

FOREIGN PATENT DOCUMENTS

JP 2015-058924 A 3/2015

* cited by examiner

*Primary Examiner* — Yi-Kai Wang
(74) *Attorney, Agent, or Firm* — Sughrue Mion, PLLC

(57) ABSTRACT

A vehicle includes: a motor generator; an engine having a forced induction device; and a HV-ECU. An operation region of the engine includes a PM generating region in which an amount of particulate matters included in exhaust gas of the engine is more than a predetermined amount due to a load of the engine being abruptly increased during boosting by the forced induction device. The PM generating region is a low-rotation and high-torque region. When assistance by the motor generator is sufficiently obtained and the engine is operated in the PM generating region, the HV-ECU restricts an increasing rate of the torque of the engine to be less than or equal to an upper limit rate. The HV-ECU complements, by the torque of the motor generator, the torque of the engine restricted by restricting the increasing rate of the torque of the engine.

3 Claims, 7 Drawing Sheets

(51) Int. Cl.
*B60W 10/08* (2006.01)
*F02D 41/02* (2006.01)
(52) U.S. Cl.
CPC . *F02D 41/0235* (2013.01); *B60W 2510/0638* (2013.01); *B60W 2510/0657* (2013.01); *B60W 2710/0666* (2013.01); *B60W 2710/083* (2013.01)
(58) Field of Classification Search
CPC ...... F02D 29/02; F02D 2250/26; Y02T 10/62; Y02T 10/72; B60K 6/445
USPC .......................................................... 701/22
See application file for complete search history.

[CASE WHERE SUFFICIENT ASSISTANCE BY MG IS OBTAINED]

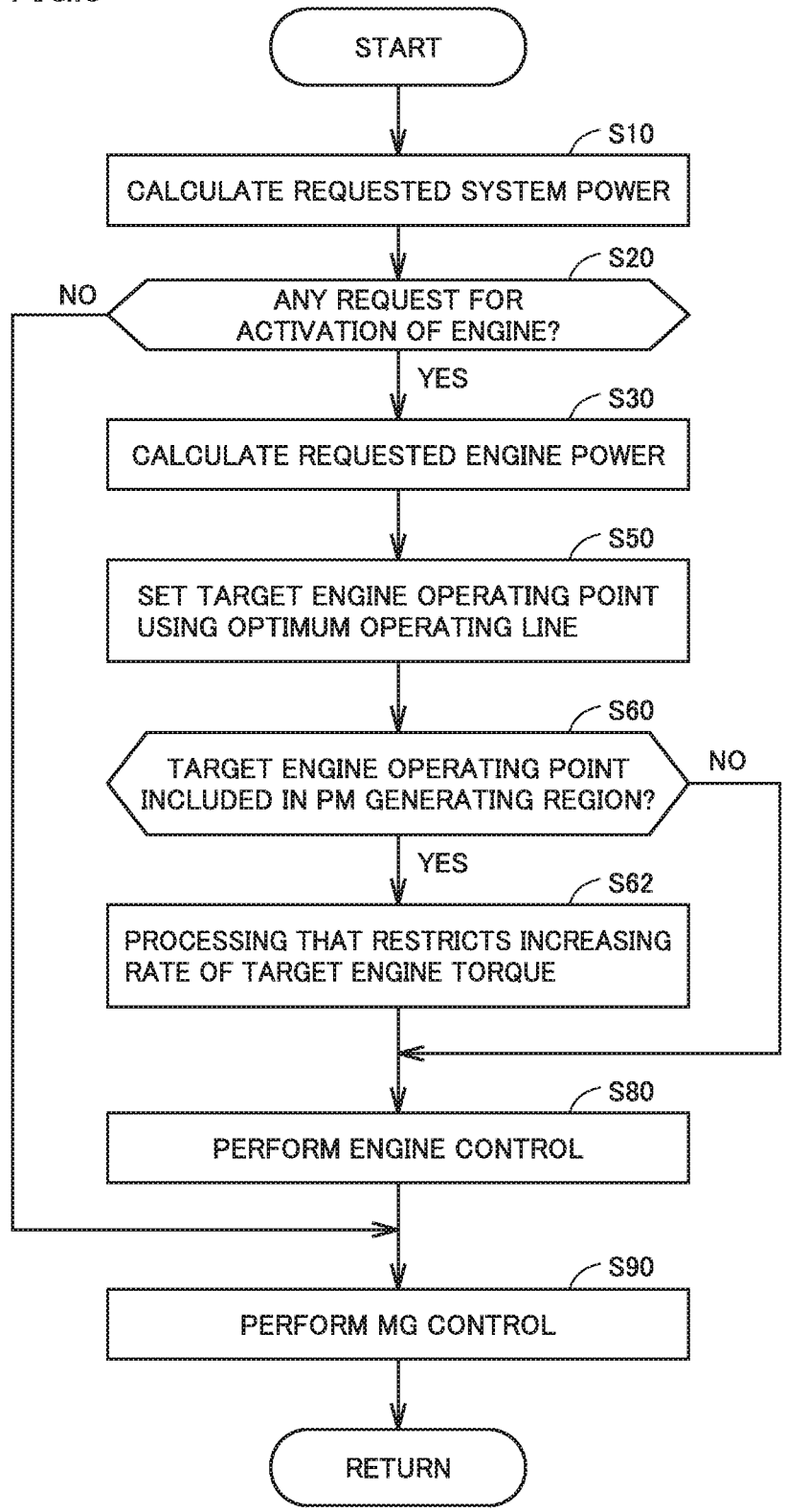

HYBRID VEHICLE AND METHOD OF CONTROLLING HYBRID VEHICLE

This nonprovisional application is based on Japanese Patent Application No. 2019-077718 filed on Apr. 16, 2019, with the Japan Patent Office, the entire contents of which are hereby incorporated by reference.

BACKGROUND

Field

The present disclosure relates to: a hybrid vehicle including, as drive sources, a rotating electrical machine and an internal combustion engine having a forced induction device; and control thereof.

Description of the Background Art

Conventionally, a hybrid vehicle has been known which includes, as drive sources, a rotating electrical machine and an internal combustion engine having a forced induction device (for example, see Japanese Patent Laying-Open No. 2015-58924).

SUMMARY

It has been known that an operation region of such an internal combustion engine having a forced induction device includes a specific region in which an amount of particulate matters (PM) included in exhaust gas of the internal combustion engine is more than a predetermined value due to a load of the internal combustion engine being abruptly increased during boosting by the forced induction device. This specific region generally exists in a low-rotation and high-torque region. In the description below, this specific region is also referred to as "PM generating region".

In the PM generating region, a large amount of particulate matters is generated due to the load of the internal combustion engine being abruptly increased during boosting by the forced induction device as described above, with the result that emission may become deteriorated. To address this, if the output of the internal combustion engine is restricted so as to simply avoid an operating point of the internal combustion engine from being included in the PM generating region, drive torque or drive force requested for the vehicle cannot be generated, with the result that deteriorated drivability of the vehicle is concerned.

The present disclosure has been made to solve the above-described problem, and has an object to suppress deteriorated emission and deteriorated drivability in a hybrid vehicle including a rotating electrical machine and an internal combustion engine having a forced induction device.

(1) A hybrid vehicle according to the present disclosure includes: an internal combustion engine having a forced induction device; a rotating electrical machine; a drive wheel connected to the internal combustion engine and the rotating electrical machine; and a controller that controls the internal combustion engine and the rotating electrical machine. An operation region of the internal combustion engine includes a specific region in which an amount of particulate matters included in exhaust gas of the internal combustion engine is more than a predetermined amount due to a load of the internal combustion engine being increased during boosting by the forced induction device. The specific region is a region in which a rotation speed of the internal combustion engine is lower than a predetermined speed and torque of the internal combustion engine is higher than predetermined torque. When an operating point of the internal combustion engine is included in the specific region, the controller performs first control that restricts an increasing rate of the torque of the internal combustion engine to be less than or equal to an upper limit rate, and the controller controls the rotating electrical machine to complement, by torque of the rotating electrical machine, the torque of the internal combustion engine restricted by the first control.

(2) In a certain embodiment, when an output that is able to be generated by the rotating electrical machine is larger than a predetermined value, the controller performs, instead of the first control, second control that restricts an output of the internal combustion engine so as to avoid the operating point of the internal combustion engine from being included in the specific region, and the controller controls the rotating electrical machine to complement, by the output of the rotating electrical machine, the output of the internal combustion engine restricted by the second control.

(3) A control method according to the present disclosure is a method of controlling a hybrid vehicle. The hybrid vehicle includes: an internal combustion engine having a forced induction device; a rotating electrical machine; and a drive wheel connected to the internal combustion engine and the rotating electrical machine. An operation region of the internal combustion engine includes a specific region in which an amount of particulate matters included in exhaust gas of the internal combustion engine is more than a predetermined amount due to a load of the internal combustion engine being increased during boosting by the forced induction device. The specific region is a region in which a rotation speed of the internal combustion engine is lower than a predetermined speed and torque of the internal combustion engine is higher than predetermined torque. The method includes: when an operating point of the internal combustion engine is included in the specific region, performing first control that restricts an increasing rate of the torque of the internal combustion engine to be less than or equal to an upper limit rate; and controlling the rotating electrical machine to complement, by torque of the rotating electrical machine, the torque of the internal combustion engine restricted by the first control.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 is a second flowchart showing exemplary processing performed by the HV-ECU.

DESCRIPTION OF THE PREFERRED EMBODIMENTS

Figure 1:
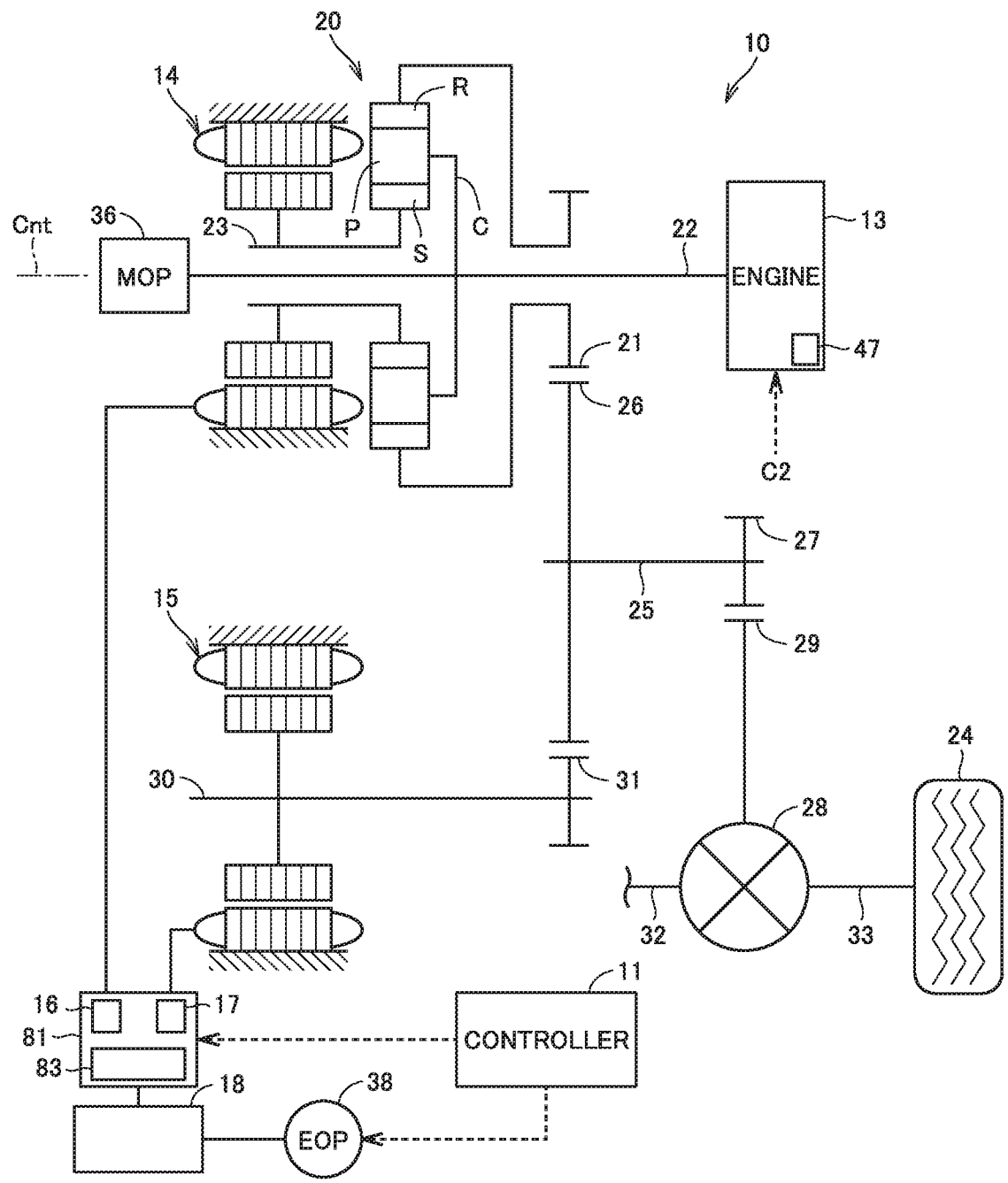
FIG. 1 is a diagram showing an exemplary configuration of a drive system of a hybrid vehicle.

The following describes embodiments of the present disclosure with reference to figures in detail. It should be noted that the same or corresponding portions in the figures are given the same reference characters and are not described repeatedly.

<As to Drive System of Hybrid Vehicle>

FIG. 1 is a diagram showing an exemplary configuration of a drive system of a hybrid vehicle (hereinafter, also simply referred to as "vehicle") 10. As shown in FIG. 1, as drive sources for running, vehicle 10 includes: an engine (internal combustion engine) 13; and a second motor generator (rotating electrical machine, which is hereinafter also referred to as "second MG") 15. Vehicle 10 further includes a controller 11 and a first motor generator (hereinafter, also referred to as "first MG") 14.

Engine 13 has a forced induction device (turbocharger) 47. First MG 14 and second MG 15 each have a function as a motor that outputs torque by being supplied with driving electric power and have a function as a generator that generates electric power by being supplied with torque. An alternating current (AC) rotating electric machine is employed for first MG 14 and second MG 15. The AC rotating electric machine includes, for example, a permanent magnet synchronous motor including a rotor having a permanent magnet embedded.

First MG 14 and second MG 15 are electrically connected to a battery 18 with a power control unit (PCU) 81 being interposed. PCU 81 includes a first inverter 16, a second inverter 17, and a converter 83.

For example, converter 83 can up-convert electric power from battery 18 and supply up-converted electric power to first inverter 16 or second inverter 17. Alternatively, converter 83 can down-convert electric power supplied from first inverter 16 or second inverter 17 and supply down-converted electric power to battery 18.

First inverter 16 can convert direct current (DC) power from converter 83 into AC power and supply AC power to first MG 14. Alternatively, first inverter 16 can convert AC power from first MG 14 into DC power and supply DC power to converter 83.

Second inverter 17 can convert DC power from converter 83 into AC power and supply AC power to second MG 15. Alternatively, second inverter 17 can convert AC power from second MG 15 into DC power and supply DC power to converter 83.

PCU 81 charges battery 18 with electric power generated by first MG 14 or second MG 15 or drives first MG 14 or second MG 15 with electric power from battery 18.

Battery 18 includes, for example, a lithium ion secondary battery, a nickel metal hydride secondary battery, or the like. The lithium ion secondary battery is a secondary battery in which lithium is adopted as a charge carrier, and may include not only a general lithium ion secondary battery containing a liquid electrolyte but also what is called an all-solid-state battery containing a solid electrolyte. Battery 18 should only be a power storage that is at least rechargeable, and for example, an electric double layer capacitor may be employed instead of the secondary battery.

Engine 13 and first MG 14 are coupled to a planetary gear mechanism 20. Planetary gear mechanism 20 divides drive torque output by engine 13 into drive torque for first MG 14 and drive torque for output gear 21, and transmits divided drive torque to first MG 14 and output gear 21. Planetary gear mechanism 20 includes a single-pinion planetary gear mechanism and is arranged on an axis Cnt coaxial with an output shaft 22 of engine 13.

Planetary gear mechanism 20 includes a sun gear S, a ring gear R arranged coaxially with sun gear S, a pinion gear P meshed with sun gear S and ring gear R, and a carrier C holding pinion gear P in a rotatable and revolvable manner. Output shaft 22 is coupled to carrier C. A rotor shaft 23 of first MG 14 is coupled to sun gear S. Ring gear R is coupled to output gear 21. Output gear 21 is an exemplary output element for transmitting drive torque to a drive wheel 24.

In planetary gear mechanism 20, carrier C to which drive torque output from engine 13 is transmitted serves as an input element, ring gear R that outputs drive torque to output gear 21 serves as an output element, and sun gear S to which rotor shaft 23 is coupled serves as a reaction force element. Planetary gear mechanism 20 divides motive power output from engine 13 into motive power on a side of first MG 14 and motive power on a side of output gear 21. First MG 14 is controlled to output torque in accordance with an engine rotation speed.

A countershaft 25 is arranged in parallel to axis Cnt. Countershaft 25 is attached to a driven gear 26 meshed with output gear 21. A drive gear 27 is attached to countershaft 25, and drive gear 27 is meshed with a ring gear 29 in a differential gear 28 representing a final reduction gear. A drive gear 31 attached to a rotor shaft 30 in second MG 15 is meshed with driven gear 26. Therefore, drive torque output from second MG 15 is added to drive torque output from output gear 21 in a part of driven gear 26. Drive torque thus combined is transmitted to drive wheel 24 with driveshafts 32 and 33 extending laterally from differential gear 28 being interposed. As drive torque is transmitted to drive wheel 24, driving force is generated in vehicle 10.

A mechanical oil pump (which is denoted as an "MOP" below) 36 is provided coaxially with output shaft 22. MOP 36 delivers lubricating oil with a cooling function, for example, to planetary gear mechanism 20, first MG 14, second MG 15, and differential gear 28. Vehicle 10 further includes an electric oil pump (which is denoted as an "EOP" below) 38. EOP 38 is driven by electric power supplied from battery 18 when operation of engine 13 is stopped, and it delivers lubricating oil to planetary gear mechanism 20, first MG 14, second MG 15, and differential gear 28 in a manner the same as or similar to MOP 36.

<As to Configuration of Engine>

Figure 2:
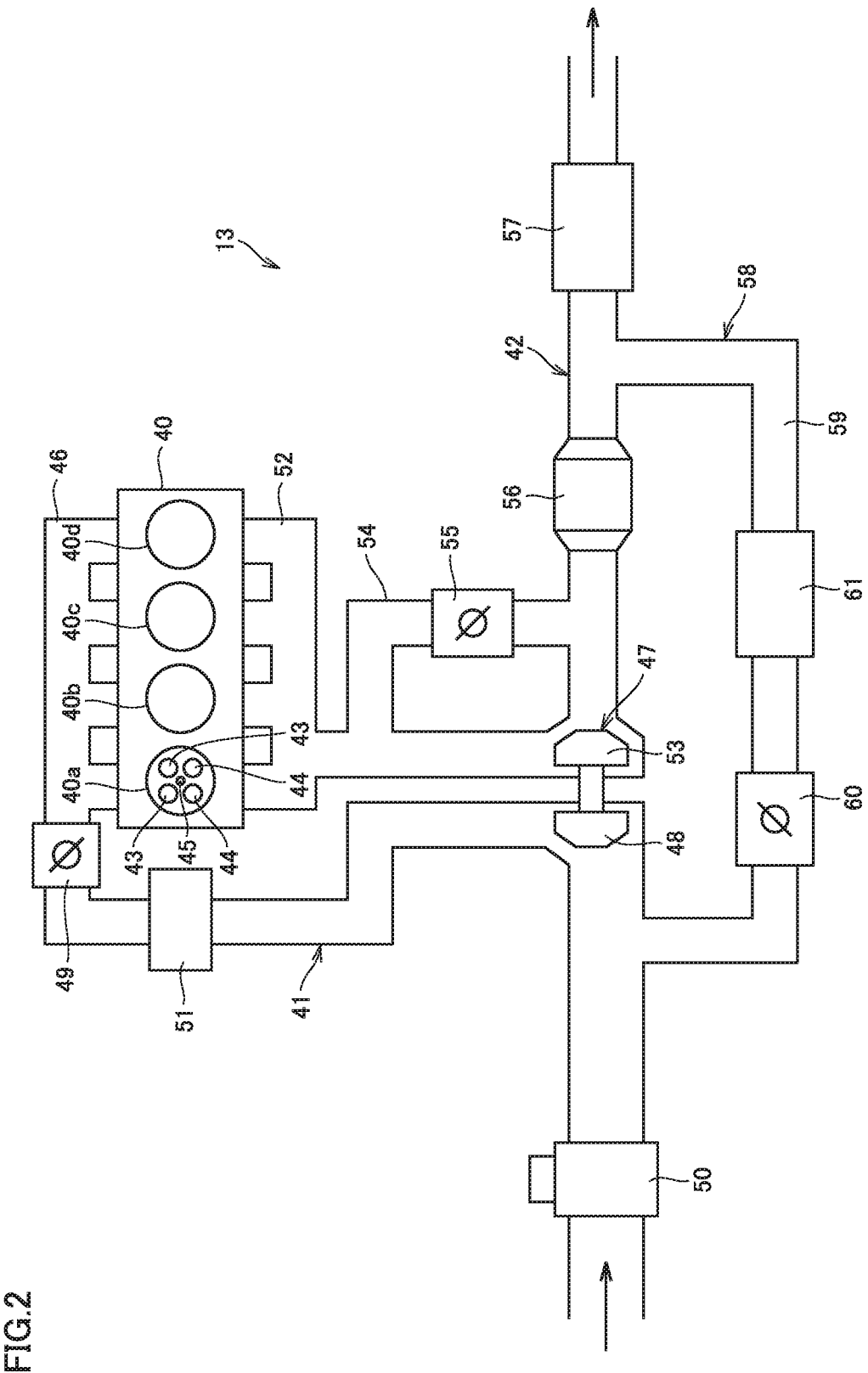
FIG. 2 is a diagram showing an exemplary configuration of an engine having a forced induction device.

FIG. 2 is a diagram showing an exemplary configuration of engine 13 having forced induction device 47. Engine 13 is, for example, an in-line four-cylinder spark ignition internal combustion engine. As shown in FIG. 2, engine 13 includes, for example, an engine main body 40 formed with four cylinders 40a, 40b, 40c, and 40d being aligned in one direction.

One ends of intake ports and one ends of exhaust ports formed in engine main body 40 are connected to cylinders 40a, 40b, 40c, and 40d. One end of the intake port is opened and closed by two intake valves 43 provided in each of cylinders 40a, 40b, 40c, and 40d, and one end of the exhaust port is opened and closed by two exhaust valves 44 provided in each of cylinders 40a, 40b, 40c and 40d. The other ends of the intake ports of cylinders 40a, 40b, 40c, and 40d are connected to an intake manifold 46. The other ends of the exhaust ports of cylinders 40a, 40b, 40c, and 40d are connected to an exhaust manifold 52.

In the present embodiment, engine 13 is, for example, a direct injection engine and fuel is injected into each of cylinders 40a, 40b, 40c, and 40d by a fuel injector (not shown) provided at the top of each cylinder. An air fuel mixture of fuel and intake air in cylinders 40a, 40b, 40c, and 40d is ignited by an ignition plug 45 provided in each of cylinders 40a, 40b, 40c, and 40d.

FIG. 2 shows intake valve 43, exhaust valve 44, and ignition plug 45 provided in cylinder 40a and does not show intake valves 43, exhaust valves 44, and ignition plugs 45 provided in other cylinders 40b, 40c, and 40d.

Engine 13 is provided with forced induction device 47 that uses exhaust energy to boost suctioned air. Forced induction device 47 includes a compressor 48 and a turbine 53.

An intake air passage 41 has one end connected to intake manifold 46. Intake air passage 41 has the other end connected to an air inlet. Compressor 48 is provided at a prescribed position in intake air passage 41. An air flow meter 50 that outputs a signal corresponding to a flow rate of air that flows through intake air passage 41 is provided between the other end (air inlet) of intake air passage 41 and compressor 48. An intercooler 51 that cools intake air fed with a pressure by compressor 48 is disposed in intake air passage 41 provided downstream from compressor 48. A throttle valve 49 that can regulate a flow rate of intake air that flows through intake air passage 41 is provided between intercooler 51 and one end of intake air passage 41.

An exhaust passage 42 has one end connected to exhaust manifold 52. Exhaust passage 42 has the other end connected to a muffler (not shown). Turbine 53 is provided at a prescribed position in exhaust passage 42. In exhaust passage 42, a bypass passage 54 that bypasses exhaust gas upstream from turbine 53 to a portion downstream from turbine 53 and a waste gate valve 55 provided in the bypass passage and capable of regulating a flow rate of exhaust gas guided to turbine 53 are provided. Therefore, a flow rate of exhaust gas that flows into turbine 53, that is, a boost pressure of suctioned air, is regulated by controlling a degree of opening of waste gate valve 55. Exhaust gas that passes through turbine 53 or waste gate valve 55 is purified by a start-up converter 56 and an aftertreatment apparatus 57 provided at prescribed positions in exhaust passage 42, and thereafter emitted into the atmosphere. Aftertreatment apparatus 57 contains, for example, a three-way catalyst.

Engine 13 is provided with an exhaust gas recirculation (EGR) apparatus 58 that has exhaust gas flow into intake air passage 41. EGR apparatus 58 includes an EGR passage 59, an EGR valve 60, and an EGR cooler 61. EGR passage 59 allows some of exhaust gas to be taken out of exhaust passage 42 as EGR gas and guides EGR gas to intake air passage 41. EGR valve 60 regulates a flow rate of EGR gas that flows through EGR passage 59. EGR cooler 61 cools EGR gas that flows through EGR passage 59. EGR passage 59 connects a portion of exhaust passage 42 between start-up converter 56 and aftertreatment apparatus 57 to a portion of intake air passage 41 between compressor 48 and air flow meter 50.

<As to Configuration of Controller>

Figure 3:
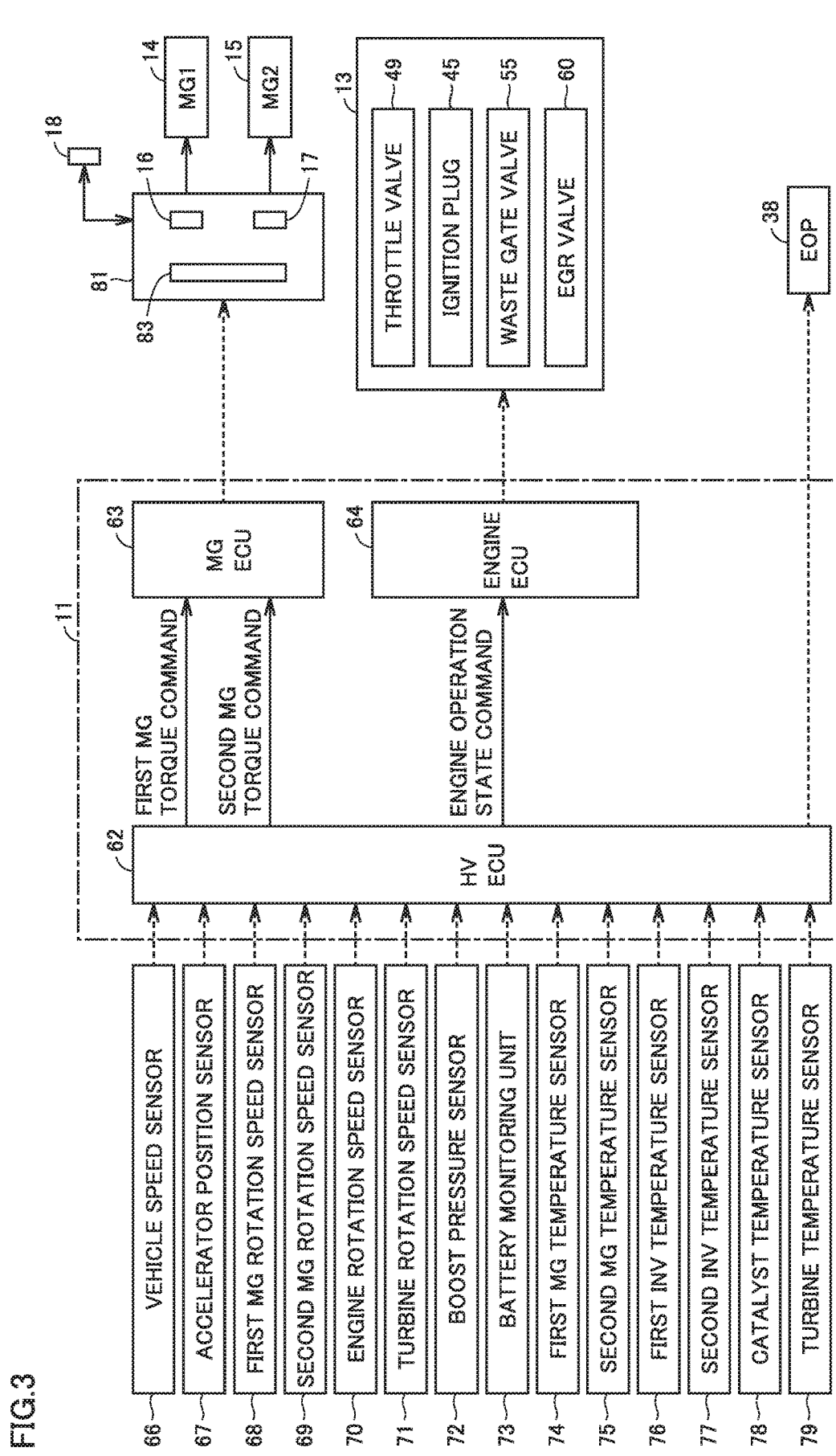
FIG. 3 is a block diagram showing an exemplary configuration of a controller.

FIG. 3 is a block diagram showing an exemplary configuration of controller 11. As shown in FIG. 3, controller 11 includes a hybrid vehicle (HV)-electronic control unit (ECU) 62, an MG-ECU 63, and an engine ECU 64.

HV-ECU 62 is a controller that controls engine 13, first MG 14, and second MG 15 in coordination. MG-ECU 63 is a controller that controls an operation of PCU 81. Engine ECU 64 is a controller that controls an operation of engine 13.

HV-ECU 62, MG-ECU 63, and engine ECU 64 each include an input and output apparatus that supplies and receives signals to and from various sensors and other ECUs that are connected, a storage that serves for storage of various control programs or maps (including a read only memory (ROM) and a random access memory (RAM)), a central processing unit (CPU) that executes a control program, and a counter that counts time.

A vehicle speed sensor 66, an accelerator position sensor 67, a first MG rotation speed sensor 68, a second MG rotation speed sensor 69, an engine rotation speed sensor 70, a turbine rotation speed sensor 71, a boost pressure sensor 72, a battery monitoring unit 73, a first MG temperature sensor 74, a second MG temperature sensor 75, a first INV temperature sensor 76, a second INV temperature sensor 77, a catalyst temperature sensor 78, and a turbine temperature sensor 79 are connected to HV-ECU 62.

Vehicle speed sensor 66 detects a speed of vehicle 10 (vehicle speed). Accelerator position sensor 67 detects an amount of pressing of an accelerator pedal (accelerator position). First MG rotation speed sensor 68 detects a rotation speed of first MG 14. Second MG rotation speed sensor 69 detects a rotation speed of second MG 15. Engine rotation speed sensor 70 detects a rotation speed of output shaft 22 of engine 13 (engine rotation speed). Turbine rotation speed sensor 71 detects a rotation speed of turbine 53 of forced induction device 47. Boost pressure sensor 72 detects a boost pressure of engine 13. First MG temperature sensor 74 detects an internal temperature of first MG 14 such as a temperature associated with a coil or a magnet. Second MG temperature sensor 75 detects an internal temperature of second MG 15 such as a temperature associated with a coil or a magnet. First INV temperature sensor 76 detects a temperature of first inverter 16 such as a temperature associated with a switching element. Second INV temperature sensor 77 detects a temperature of second inverter 17 such as a temperature associated with a switching element. Catalyst temperature sensor 78 detects a temperature of aftertreatment apparatus 57. Turbine temperature sensor 79 detects a temperature of turbine 53. Various sensors output signals indicating results of detection to HV-ECU 62.

Battery monitoring unit 73 obtains a state of charge (SOC) representing a ratio of a remaining amount of charge to a full charge capacity of battery 18 and outputs a signal indicating the obtained SOC to HV-ECU 62.

Battery monitoring unit 73 includes, for example, a sensor that detects a current, a voltage, and a temperature of battery 18. Battery monitoring unit 73 obtains an SOC by calculating the SOC using the detected current, voltage, and temperature of battery 18.

Various known approaches such as an approach by accumulation of current values (coulomb counting) or an approach by estimation of an open circuit voltage (OCV) can be adopted as a method of calculating an SOC.

<As to Control of Running of Vehicle>

Vehicle 10 configured as above can be set or switched to such a running mode as a hybrid (HV) running mode in which engine 13 and second MG 15 serve as motive power sources and an electric (EV) running mode in which the vehicle runs with engine 13 remaining stopped and second MG 15 being driven by electric power stored in battery 18. Setting of and switching to each mode is made by HV-ECU 62. HV-ECU 62 controls engine 13, first MG 14, and second MG 15 based on the set or switched running mode.

The EV running mode is selected, for example, in a low-load operation region where a vehicle speed is low and requested driving force is low, and refers to a running mode in which an operation of engine 13 is stopped and second MG 15 outputs driving force.

The HV running mode is selected in a high-load operation region where a vehicle speed is high and requested driving force is high, and refers to a running mode in which combined torque of drive torque of engine 13 and drive torque of second MG 15 is output.

In the HV running mode, in transmitting drive torque output from engine 13 to drive wheel 24, first MG 14 applies reaction force to planetary gear mechanism 20. Therefore, sun gear S functions as a reaction force element. In other words, in order to apply engine torque to drive wheel 24, first MG 14 is controlled to output reaction torque against engine torque. In this case, regenerative control in which first MG 14 functions as a generator can be carried out.

Control of engine 13, first MG 14, and second MG 15 in coordination while vehicle 10 operates will be described below.

HV-ECU 62 calculates requested drive torque based on an accelerator position determined by an amount of pressing of the accelerator pedal and the like. For example, HV-ECU 62 calculates requested running power of vehicle 10 based on the calculated requested drive torque, a vehicle speed and the like. HV-ECU 62 calculates a value resulting from addition of requested charging and discharging power of battery 18 to requested running power as requested system power. It should be noted that the requested charging and discharging power of battery 18 is set in accordance with an SOC of battery 18, for example.

HV-ECU 62 determines whether or not activation of engine 13 is requested in accordance with calculated requested system power. HV-ECU 62 determines that activation of engine 13 is requested, for example, when requested system power exceeds a threshold value. When activation of engine 13 is requested, HV-ECU 62 sets the HV running mode as the running mode. When activation of engine 13 is not requested, HV-ECU 62 sets the EV running mode as the running mode.

When activation of engine 13 is requested (that is, when the HV running mode is set), HV-ECU 62 calculates power requested for engine 13 (which is denoted as "requested engine power" below). For example, HV-ECU 62 calculates requested system power as requested engine power. HV-ECU 62 outputs calculated requested engine power as an engine operation state command to engine ECU 64.

Based on the engine operation state command received from HV-ECU 62, engine ECU 64 performs various types of control for each component of engine 13 such as throttle valve 49, ignition plug 45, waste gate valve 55, and EGR valve 60.

HV-ECU 62 sets, using calculated requested engine power, an operating point of engine 13 in a coordinate system defined by an engine rotation speed and engine torque. HV-ECU 62 sets, for example, an intersection between an equal power line equal in output to requested engine power in the coordinate system and a predetermined operating line as the operating point of engine 13.

The predetermined operating line represents a trace of change of the engine torque with respect to change of the engine rotation speed in the coordinate system. As described below, in the present embodiment, one of two operating lines (an optimum operating line and a PM suppression operating line shown in FIG. 4) is selectively used as the predetermined operating line.

HV-ECU 62 sets the engine rotation speed corresponding to the set operating point as a target engine rotation speed.

As the target engine rotation speed is set, HV-ECU 62 sets a torque command value for first MG 14 for setting a current engine rotation speed to the target engine rotation speed. HV-ECU 62 sets the torque command value for first MG 14, for example, through feedback control based on a difference between a current engine rotation speed and the target engine rotation speed.

HV-ECU 62 calculates engine torque to be transmitted to drive wheel 24 based on the set torque command value for first MG 14 and sets a torque command value for second MG 15 so as to fulfill requested driving force. HV-ECU 62 outputs set torque command values for first MG 14 and second MG 15 as a first MG torque command and a second MG torque command to MG-ECU 63.

MG-ECU 63 calculates a current value corresponding to torque to be generated by first MG 14 and second MG 15 and a frequency thereof based on the first MG torque command and the second MG torque command received from HV-ECU 62, and outputs a signal including the calculated current value and the frequency thereof to PCU 81.

Further, HV-ECU 62 regulates a flow rate of exhaust gas flowing into turbine 53 of forced induction device 47 by regulating a degree of opening of waste gate valve 55 in accordance with an operating point of engine 13, i.e., regulates a boost pressure of the suctioned air through compressor 48.

Each of HV-ECU 62, MG-ECU 63, and engine ECU 64 has a CPU (Central Processing Unit) (not shown) and a memory (not shown) included therein. Though FIG. 3 illustrates a configuration in which HV-ECU 62, MG-ECU 63, and engine ECU 64 are separately provided by way of example, the ECUs may be integrated as a single ECU.

<Achieving Both Suppressed PM and Drivability>

Figure 4:
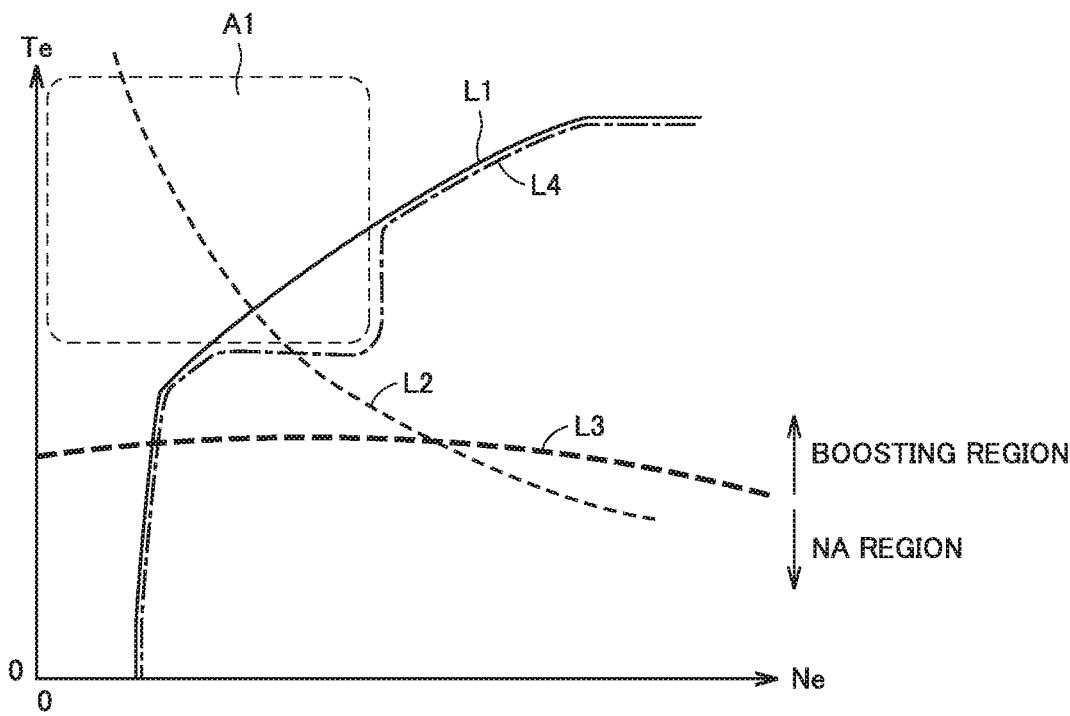
FIG. 4 is a diagram for illustrating an operating point of the engine.

FIG. 4 is a diagram for illustrating the operating point of engine 13. In FIG. 4, the vertical axis represents torque Te of engine 13 and the horizontal axis represents a rotation speed Ne of engine 13.

A curve L1 represents an optimum operating line of engine 13. The optimum operating line is an operating line determined beforehand by an advance assessment test, a simulation or the like so as to attain minimum fuel consumption of engine 13.

A curve L2 is an equal power line of engine 13 corresponding to requested power. Since the power of engine 13 is a product of torque Te and rotation speed Ne, equal power line L2 is represented by an inversely proportional curve in FIG. 4. By controlling engine 13 to position the operating point of engine 13 at an intersection between optimum operating line L1 and equal power line L2, fuel consumption of engine 13 corresponding to requested power becomes optimum (minimum).

A curve L3 represents a line (boosting line) at which boosting by forced induction device 47 is started. In an NA region in which torque Te of engine 13 is less than boosting line L1, controller 11 fully opens waste gate valve 55. Accordingly, exhaust gas is not introduced into turbine 53 of forced induction device 47 and flows in bypass passage 54. Hence, boosting by forced induction device 47 is not performed. On the other hand, in the boosting region in which torque Te is more than boosting line L1, controller 11 operates fully opened waste gate valve 55 in a closing direction. Accordingly, turbine 53 of forced induction device 47 is rotated by exhaust energy, thus resulting in boosting by forced induction device 47. By regulating the degree of opening of waste gate valve 55, the flow rate of exhaust gas flowing into turbine 53 of forced induction device 47 is regulated, thereby regulating boost pressure of the suctioned air through compressor 48.

A region A1 represents a PM generating region. This PM generating region A1 is a region in which an amount of PM included in the exhaust gas of engine 13 is more than a predetermined reference value due to a load (torque) of engine 13 being abruptly increased during boosting by forced induction device 47. As shown in FIG. 4, PM generating region A1 exists in a low-rotation and high-torque region (region in which rotation speed Ne is lower than a predetermined speed and torque Te is higher than predetermined torque). Since PM generating region A1 exists in the boosting region, boosting by forced induction device 47 is performed in PM generating region A1. Therefore, it is concerned that when the load of engine 13 is abruptly increased in the case where the operating point of engine 13 is included in PM generating region A1, a large amount of particulate matters is generated to result in deteriorated emission.

In view of this, in the present embodiment, a PM suppression operating line L4 different from optimum operating line L1 is provided as the operating line of engine 13. PM suppression operating line L4 is an operating line obtained by changing part of optimum operating line L1 included in PM generating region A1 to the low-torque side so as to avoid the part of optimum operating line L1 from being included in PM generating region A1. Therefore, when the operating point of engine 13 is changed on PM suppression operating line L4, engine 13 is not operated in PM generating region A1, thereby suppressing deteriorated emission. However, the output of engine 13 is restricted and the running torque or running power requested for vehicle 10 cannot be generated, with the result that deteriorated drivability of vehicle 10 is concerned.

To address this, controller 11 according to the present embodiment selects one of optimum operating line L1 and PM suppression operating line L4 in accordance with whether or not sufficient assistance by second MG 15 is obtained, and controls engine 13 using the selected operating line.

Specifically, controller 11 first determines whether or not sufficient assistance by second MG 15 is obtained. This determination is made to determine whether a restricted output of engine 13 can be sufficiently complemented by assistance by second MG 15 when PM suppression operating line L4 is selected to more restrict the output of engine 13 than that in the case where optimum operating line L1 is selected. For example, controller 11 determines that sufficient assistance by second MG 15 is obtained when an output (power or torque) that can be generated by second MG 15 is larger than a predetermined value. The "predetermined value" in this case is set to a value larger than the output of engine 13 restricted by selecting PM suppression operating line L4 (difference between the output of engine 13 when optimum operating line L1 is selected and the output of engine 13 when PM suppression operating line L4 is selected).

When it is determined that sufficient assistance by second MG 15 is obtained, controller 11 selects PM suppression operating line L4 and controls engine 13 using PM suppression operating line L4. When running torque or running power is insufficient by using PM suppression operating line L4, controller 11 complements the insufficiency by the output (torque or power) of second MG 15.

Figure 5:
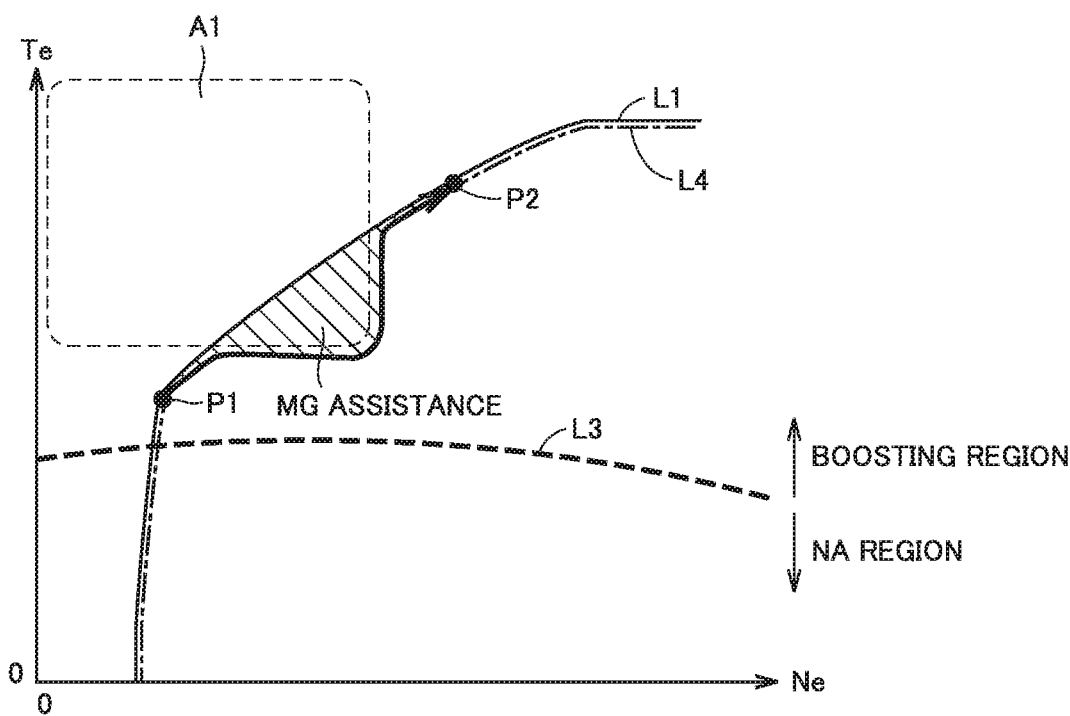
FIG. 5 is a diagram showing an exemplary trace of change of an operating point of the engine when sufficient assistance by a second MG is obtained.

FIG. 5 shows an exemplary trace of change of the operating point of engine 13 when sufficient assistance by second MG 15 is obtained. When sufficient assistance by second MG 15 is obtained, engine 13 is controlled using PM suppression operating line L4 as described above. Hence, when the operating point of engine 13 is changed from a first operating point P1 at the low-load side to a second operating point P2 at the high-load side as shown in FIG. 5, the operating point of engine 13 is changed along PM suppression operating line L4. As a result, engine 13 is avoided from being operated in PM generating region A1, thereby suppressing deteriorated emission. On the other hand, as indicated by a shaded portion of FIG. 5, the output (power or torque) of engine 13 is restricted as compared with a case where optimum operating line L1 is used. When the running power or running torque becomes insufficient due to an influence thereof, controller 11 controls second MG 15 to complement the insufficiency by the output (power or torque) of second MG 15. Accordingly, deteriorated drivability of vehicle 10 is suppressed.

Meanwhile, when sufficient assistance by second MG 15 is not obtained, controller 11 selects optimum operating line L1, and controls engine 13 using optimum operating line L1. In this case, engine 13 is permitted to be operated in PM generating region A1. Hence, it is concerned that when the load of engine 13 is abruptly increased in PM generating region A1, a large amount of particulate matters is generated to result in deteriorated emission.

Therefore, when controller 11 controls engine 13 using optimum operating line L1 and the operating point of engine 13 is included in PM generating region A1, controller 11 performs processing that restricts an increasing rate of torque Te of engine 13 to be less than or equal to a predetermined upper limit rate. Accordingly, the load (torque Te) of engine 13 is suppressed from being abruptly increased in PM generating region A1. As a result, an amount of generated particulate matters can be suppressed to be less than a reference value.

On the other hand, when the running torque is insufficient due to the increasing rate of torque Te of engine 13 being restricted, controller 11 controls second MG 15 to complement the insufficiency by the output torque of second MG 15 as much as possible. Accordingly, deteriorated drivability of vehicle 10 can be suppressed as small as possible.

Figure 6:
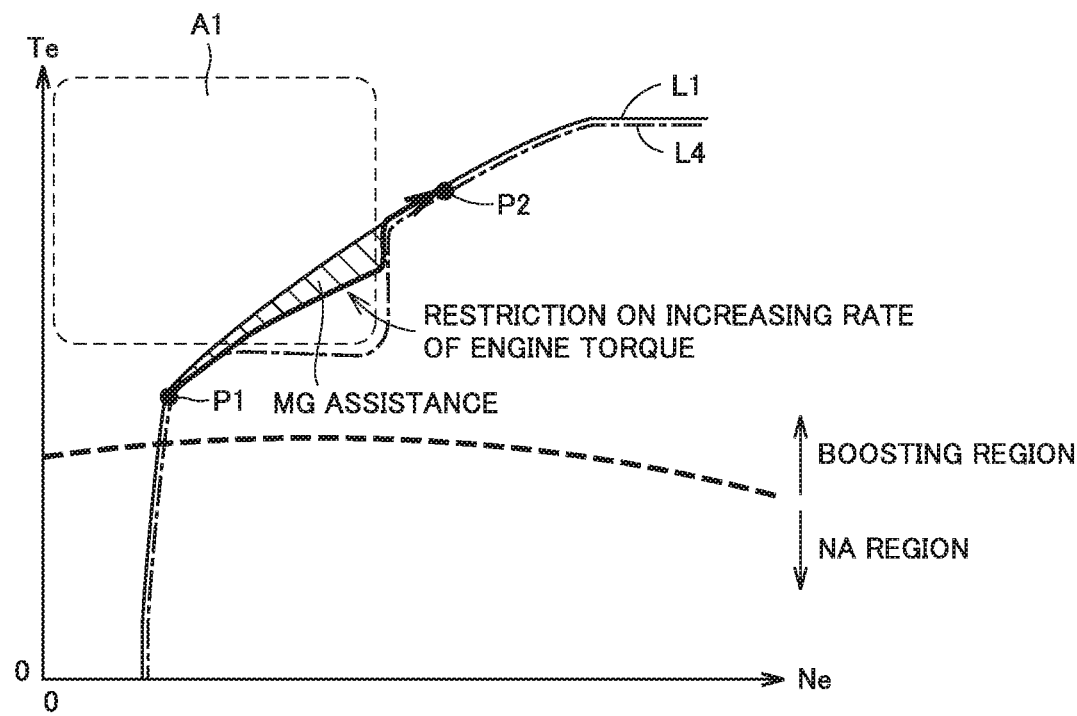
FIG. 6 is a diagram showing an exemplary trace of change of the operating point of the engine when sufficient assistance by the second MG is not obtained.

FIG. 6 shows an exemplary trace of change of the operating point of engine 13 when sufficient assistance by second MG 15 is not obtained. When sufficient assistance by second MG 15 is not obtained, engine 13 is controlled using optimum operating line L1 as described above. Accordingly, the operating point of engine 13 is permitted to be included in PM generating region A1.

When the operating point of engine 13 is changed from first operating point P1 at the low-load side to second operating point P2 at the high-load side as shown in FIG. 5, there can be a period during which the operating point of engine 13 is included in PM generating region A1; however, during the period, the increasing rate of torque Te of engine 13 is restricted to be less than or equal to the upper limit rate as described above. Accordingly, torque Te (load) of engine 13 is suppressed from being abruptly increased in PM generating region A1, whereby the load of engine 13 is increased gradually. As a result, an amount of generated particulate matters can be suppressed as small as possible.

When torque Te of engine 13 is insufficient due to the increasing rate of torque Te of engine 13 being restricted to be less than or equal to the upper limit rate, controller 11 controls second MG 15 to complement the insufficiency (torque corresponding to the shaded portion of FIG. 6) by the output torque of second MG 15 as much as possible.

Accordingly, deteriorated drivability of vehicle 10 can be suppressed as small as possible. It should be noted that FIG. 6 shows an example in which the operating point of engine 13 passes through the low-torque side relative to optimum operating line L1 in PM generating region A1 by restricting the increasing rate of torque Te to be less than or equal to the upper limit rate; however, when the increasing rate of torque Te is small (increased gradually), torque Te may not be restricted and the operating point of engine 13 may be changed along optimum operating line L1.

It should be noted that information indicating each of optimum operating line L1, PM suppression operating line L4, and PM generating region A1 is stored beforehand in a memory included in HV-ECU 62.

Figure 7:
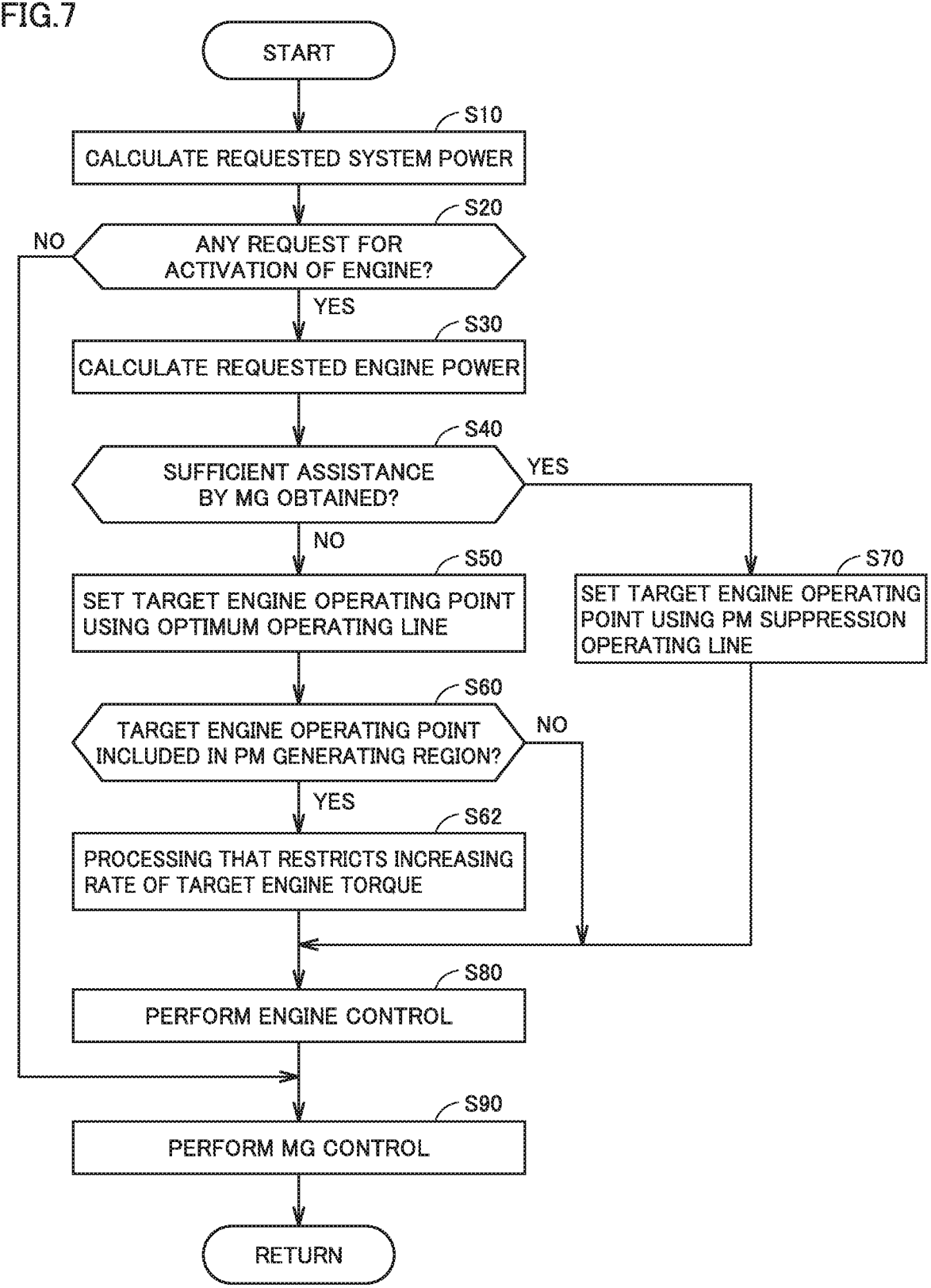
FIG. 7 is a first flowchart showing exemplary processing performed by an HV-ECU.

FIG. 7 is a flowchart showing exemplary processing performed by HV-ECU 62. Whenever a predetermined condition is satisfied (for example, whenever a predetermined period elapses), this flowchart is performed repeatedly.

HV-ECU 62 calculates requested system power (step S10). Next, HV-ECU 62 determines whether or not there is a request for activation of engine 13 (step S20). Since a method of calculating requested system power and a method of determining whether or not there is a request for activation of engine 13 are as described above, detailed description thereof will not be repeated.

When it is determined that there is a request for activation of engine 13 (YES in step S20), HV-ECU 62 calculates requested engine power (step S30). HV-ECU 62 calculates, for example, requested system power described above as requested engine power.

Next, HV-ECU 62 determines whether or not the state is such that sufficient assistance by second MG 15 is obtained (step S40). Since the significance and method of the determination are as described above, detailed description thereof will not be repeated.

When the state is not such that sufficient assistance by second MG 15 is obtained (NO in step S40), HV-ECU 62 sets a target engine operating point using optimum operating line L1 (step S50). That is, HV-ECU 62 sets, as a target engine operating point (target engine torque or target engine rotation speed), an intersection between the equal power line of the requested engine power and optimum operating line L1. Since the equal power line and optimum operating line L1 are as described above, detailed description thereof will not be repeated.

Next, HV-ECU 62 determines whether or not the target engine operating point is included in PM generating region A1 (step S60). Since PM generating region A1 is as described above, detailed description thereof will not be repeated.

When the target engine operating point is included in PM generating region A1 (YES in step S60), HV-ECU 62 performs processing that restricts the increasing rate of the target engine torque to be less than or equal to the upper limit rate as described above (step S62). For example, HV-ECU 62 calculates, as the increasing rate of the current target engine torque, a value obtained by dividing, by an elapsed period of time from a time of previous calculation to a time of the current calculation, a value obtained by subtracting the previously calculated target engine torque from the currently calculated target engine torque. When the increasing rate of the current target engine torque is more than the upper limit rate, HV-ECU 62 sets, as the target engine torque, a value obtained by adding the upper limit rate to the previously calculated target engine torque, instead of the currently calculated target engine torque. Accordingly, the target engine torque is more restricted than the torque calculated using optimum operating line L1 in current step S50. It should be noted that when the increasing rate of the current target engine torque is less than or equal to the upper limit rate, the target engine torque is not restricted. Then, HV-ECU 62 proceeds the processing to step S80.

When the target engine operating point is not included in PM generating region A1 (NO in step S60), HV-ECU 62 proceeds the processing to step S80 without performing the processing (processing of step S62) that restricts the increasing rate of the target engine torque.

When the state is such that sufficient assistance by second MG 15 is obtained (YES in step S40), HV-ECU 62 sets the target engine operating point using PM suppression operating line L4 (step S70). For example, HV-ECU 62 sets, as the target engine speed, an engine rotation speed that satisfies the requested engine power on optimum operating line L1. HV-ECU 62 sets, as the target engine torque, engine torque that satisfies the target engine rotation speed on PM suppression operating line L4. Moreover, HV-ECU 62 may set, as the target engine operating point, an intersection between PM suppression operating line L4 and the equal power line of the requested engine power. In this case, the output power of the engine is requested engine power; however, the torque is more restricted than that in the case where optimum operating line L1 is used. Since PM suppression operating line L4 is as described above, detailed description thereof will not be repeated. Then, HV-ECU 62 proceeds the processing to step S80.

When the target engine operating point is set, HV-ECU 62 performs engine control (step S80). Specifically, HV-ECU 62 generates an engine operation state command to output engine power that satisfies the target engine operating point, and outputs a signal indicating the generated engine operation state command to engine ECU 64.

Next, HV-ECU 62 performs MG control (step S90). Specifically, HV-ECU 62 generates a torque command value for first MG 14 as a first MG torque command to attain the target engine rotation speed. HV-ECU 62 outputs the generated first MG torque command to MG-ECU 63. With the above processing, the operating point of engine 13 attains the target operating point.

HV-ECU 62 calculates engine torque to be transmitted to drive wheel 24 based on the torque command value for first MG 14 and generates a torque command value for second MG 15 as the second MG command so as to fulfill requested driving force (that is, so as to generate driving force corresponding to a difference between driving force corresponding to engine torque to be transmitted to drive wheel 24 and requested driving force). HV-ECU 62 outputs the generated second MG torque command to MG-ECU 63. Accordingly, the insufficiency of the output of engine 13 is complemented by second MG 14 as much as possible.

It should be noted that when there is no request for activation of engine 13 (NO in step S20), HV-ECU 62 does not activate engine 13 and sets the torque command value for second MG 15 as a second MG torque command to generate the requested driving force only by second MG 15 (step S90).

As described above, when sufficient assistance by second MG 15 is not obtained (when engine 13 is controlled using optimum operating line L1) and when the operating point of engine 13 is included in PM generating region A1, HV-ECU 62 according to the present embodiment restricts the increasing rate of torque Te of engine 13 to be less than or equal to the upper limit rate (first control). Accordingly, the load of engine 13 is suppressed from being abruptly increased in PM generating region A1. As a result, an amount of generated particulate matters can be suppressed to be less than a reference value. Further, second MG 15 is controlled to complement, by the output torque of second MG 15 as much as possible, the torque of engine 13 restricted by the processing that restricts the increasing rate of torque Te of engine 13. Accordingly, deteriorated drivability of vehicle 10 can be suppressed as small as possible.

Moreover, when sufficient assistance by second MG 15 is obtained, HV-ECU 62 according to the present embodiment restricts the output of engine 13 by controlling engine 13 using PM suppression operating line L4 so as to avoid the operating point of engine 13 from being included in PM suppressing region A1 (second control). Then, second MG 15 is controlled to complement, by the output of second MG 15, the output of engine 13 restricted by using PM suppression operating line L4. Accordingly, deteriorated drivability can be suppressed while suppressing deteriorated emission.

Modification 1

The above description is directed to an example in which controller 11 according to the present embodiment selects one of optimum operating line L1 and PM suppression operating line L4 in accordance with whether or not sufficient assistance by second MG 15 is obtained, and controls engine 13 using the selected operating line.

However, engine 13 may be controlled only using optimum operating line L1 without using PM suppression operating line L4.

FIG. 8 is a flowchart showing exemplary processing performed by HV-ECU 62 according to the present modification. This flowchart is obtained by removing the processing of steps S40 and S70 from the flowchart shown in FIG. 7. That is, when it is determined that there is a request for activation of engine 13 (YES in step S20), HV-ECU 62 sets the target engine operating point using optimum operating line L1 irrespective of whether or not sufficient assistance by second MG 15 is obtained (step S50). When the target engine operating point is included in PM generating region A1 (YES in step S60), HV-ECU 62 performs processing that restricts the increasing rate of the target engine torque to be less than or equal to the upper limit rate (step S62).

Also with such a modification, deteriorated drivability can be suppressed while suppressing deteriorated emission.

Modification 2

Although vehicle 10 shown in FIG. 1 is a type (so-called split type) of hybrid vehicle including engine 13 and two MGs 14 and 15 as drive sources, a vehicle to which the control according to the present disclosure is applicable is not limited to vehicle 1 shown in FIG. 1. For example, the control according to the present disclosure is applicable to a general series or parallel type hybrid vehicle including an engine and one MG.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A hybrid vehicle comprising:
   an internal combustion engine having a forced induction device;
   a rotating electrical machine;
   a drive wheel connected to the internal combustion engine and the rotating electrical machine; and
   a controller that controls the internal combustion engine and the rotating electrical machine, wherein
   an operation region of the internal combustion engine includes a specific region in which an amount of particulate matters included in exhaust gas of the internal combustion engine is more than a predetermined amount due to a load of the internal combustion engine being increased during boosting by the forced induction device,
   the specific region is a region in which a rotation speed of the internal combustion engine is lower than a predetermined speed and torque of the internal combustion engine is higher than predetermined torque,
   when an operating point of the internal combustion engine is included in the specific region, the controller performs first control that restricts an increasing rate of the torque of the internal combustion engine to be less than or equal to an upper limit rate, and
   the controller controls the rotating electrical machine to complement, by torque of the rotating electrical machine, the torque of the internal combustion engine restricted by the first control.

2. The hybrid vehicle according to claim 1, wherein
   when an output that is able to be generated by the rotating electrical machine is larger than a predetermined value, the controller performs, instead of the first control, second control that restricts an output of the internal combustion engine so as to avoid the operating point of the internal combustion engine from being included in the specific region, and
   the controller controls the rotating electrical machine to complement, by the output of the rotating electrical machine, the output of the internal combustion engine restricted by the second control.

3. A method of controlling a hybrid vehicle,
   the hybrid vehicle including
   an internal combustion engine having a forced induction device,
   a rotating electrical machine, and
   a drive wheel connected to the internal combustion engine and the rotating electrical machine, wherein
   an operation region of the internal combustion engine includes a specific region in which an amount of particulate matters included in exhaust gas of the internal combustion engine is more than a predetermined amount due to a load of the internal combustion engine being increased during boosting by the forced induction device, and
   the specific region is a region in which a rotation speed of the internal combustion engine is lower than a predetermined speed and torque of the internal combustion engine is higher than predetermined torque,
   the method comprising:
   when an operating point of the internal combustion engine is included in the specific region, performing first control that restricts an increasing rate of the torque of the internal combustion engine to be less than or equal to an upper limit rate; and
   controlling the rotating electrical machine to complement, by torque of the rotating electrical machine, the torque of the internal combustion engine restricted by the first control.

* * * * *